(12) United States Patent
Wu et al.

(10) Patent No.: US 8,342,838 B2
(45) Date of Patent: Jan. 1, 2013

(54) MOLD WITH SLIDERS

(75) Inventors: Xiao-ping Wu, Tu Cheng (TW);
Shih-hsiung Ho, Tu Cheng (TW);
Kun-hsueh Chiang, Tu Cheng (TW)

(73) Assignee: Cheng Uei Precision Industry Co., Ltd., Tu Cheng, Taipei (TW)

( * ) Notice: Subject to any disclaimer, the term of this patent is extended or adjusted under 35 U.S.C. 154(b) by 339 days.

(21) Appl. No.: 12/899,532

(22) Filed: Oct. 6, 2010

(65) Prior Publication Data
US 2012/0088004 A1   Apr. 12, 2012

(51) Int. Cl.
*B29C 45/44*   (2006.01)

(52) U.S. Cl. .................. 425/556; 425/441; 425/DIG. 5; 425/DIG. 58

(58) Field of Classification Search .................. 425/556, 425/DIG. 58, DIG. 5, 441
See application file for complete search history.

(56) References Cited

U.S. PATENT DOCUMENTS

| | | | | |
|---|---|---|---|---|
| 2,330,762 | A * | 9/1943 | Tooker | 425/104 |
| 2,358,857 | A * | 9/1944 | Gits | 249/79 |
| 2,529,091 | A * | 11/1950 | Lester | 249/57 |
| 3,718,420 | A * | 2/1973 | Florjancic | 425/441 |
| 3,811,645 | A * | 5/1974 | Feist | 249/68 |
| 3,843,088 | A * | 10/1974 | McLoughlin et al. | 249/144 |
| 4,765,585 | A * | 8/1988 | Wieder | 249/64 |
| 4,854,849 | A * | 8/1989 | Sudo | 425/556 |
| 4,889,480 | A * | 12/1989 | Nakamura et al. | 425/577 |
| 5,137,442 | A * | 8/1992 | Starkey | 425/438 |
| 5,167,898 | A * | 12/1992 | Luther | 264/328.1 |
| 5,353,165 | A * | 10/1994 | VanDeMoere et al. | 359/819 |
| 5,397,226 | A * | 3/1995 | Vandenberg | 425/192 R |
| 5,536,161 | A * | 7/1996 | Smith | 425/438 |
| 5,551,864 | A * | 9/1996 | Boskovic | 425/556 |
| 5,603,968 | A * | 2/1997 | Tajiri et al. | 425/556 |
| 6,039,558 | A * | 3/2000 | Park et al. | 425/556 |
| 6,116,891 | A * | 9/2000 | Starkey | 425/556 |
| 6,474,977 | B1 * | 11/2002 | Wimmer | 425/556 |
| 6,537,053 | B1 * | 3/2003 | Watkins | 425/190 |
| 7,175,421 | B2 * | 2/2007 | Takemoto et al. | 425/577 |
| 7,435,079 | B2 * | 10/2008 | Wang et al. | 425/577 |
| 7,845,926 | B2 * | 12/2010 | Lin et al. | 425/190 |
| 7,846,370 | B2 * | 12/2010 | Yu | 264/318 |
| 8,038,433 | B2 * | 10/2011 | Cullison et al. | 425/442 |
| 8,147,238 | B1 * | 4/2012 | Zou et al. | 425/577 |
| 8,197,246 | B1 * | 6/2012 | Wang et al. | 425/556 |
| 2002/0074694 | A1 * | 6/2002 | Kurimoto | 264/318 |

* cited by examiner

*Primary Examiner* — Yogendra Gupta
*Assistant Examiner* — Emmanuel S Luk
(74) *Attorney, Agent, or Firm* — Cheng-Ju Chiang

(57) ABSTRACT

A mold includes upper and lower mold members, an upper-side slider pushing member, a slider, and an ejector rod. The upper-side slider pushing member is secured on the upper mold member. The lower mold member defines a movement space. The slider is slidably mounted on the lower mold member, and forms outer and inner angled surfaces. The ejector rod is movably mounted on the lower mold member. The ejector rod extends into the movement space and is driven by the push bar. The ejector rod and the upper-side slider pushing member are respectively engageable and thus pushing the inner and outer angled surfaces of the slider to cause the slider to slide on the lower mold member. The mold keeps the slider in a closed state while the mold is being opened, thereby preventing molded products from sticking to an upper mold member and saving internal space for the sliders.

7 Claims, 4 Drawing Sheets

MOLD WITH SLIDERS

BACKGROUND OF THE INVENTION

1. Field of the Invention

The present invention generally relates to a mold, and particularly to a mold that contains therein sliders for preventing molded products from sticking on an upper mold member of the mold.

2. Description of Prior Art

Referring to FIGS. 1 and 2, a known mold 100' is shown, comprising an upper mold member 10', a lower mold member 20', a slider 30' slidably located on the lower mold member 20' and an angled guide rod 40'. The slider 30' defines a guide groove 31' vertically extending therethrough. The slider 30' comprises an end extending into a mold cavity 21' formed in the lower mold member 20'. The angled guide rod 40' is fixed on the upper mold member 10' and comprises an end inserting into the guide groove 31' of the slider 30'.

However, when the above-mentioned mold 100' is opened and a molded plastic product is ejected, the angled guide rod 40' drives the slider 30' to slide outward. This makes it easy for the molded product to stick to and undesirably moved by the upper mold member 10'. When the mold is closed against, the molded product will be crushed, affecting the progress of the next molding cycle. It is adverse for subsequent molding process.

SUMMARY OF THE INVENTION

To solve the above-mentioned problem, an objective of the present invention is to provide a mold with sliders, which is capable of preventing finished products sticking to an upper mold member.

To achieve the above objective, the invention provides a mold with sliders, which is used with a molding machine which has a push bar, the mold comprising an upper mold member, at least one upper-side slider pushing member, a lower mold member, at least one slider, and at least one ejector rod. The upper-side slider pushing member is secured on the upper mold member. The lower mold member defines a movement space. The slider is slidably mounted on the lower mold member. The slider forms an outer angled surface and an inner angled surface. The ejector rod is movably mounted on the lower mold member. A lower end of the ejector rod movably extends into the movement space and is driven by the push bar. An end of the ejector rod is engageable and thus pushing the inner angled surface of the slider to cause the slider to slide on the lower mold member. The upper-side slider pushing member is engageable and thus pushing the outer angled surface of the slider to cause the slider to slide on the lower mold member.

As stated previously, the mold with sliders in accordance with the present invention adopts such an arrangement of ejector rods and sliders as to keep the sliders in a closed state while the mold with sliders is being opened, thereby preventing molded products from sticking to an upper mold member and saving internal space for the sliders in the mold.

BRIEF DESCRIPTION OF THE DRAWINGS

The present invention may be better understood through the following description with reference to the accompanying drawings, wherein.

DETAILED DESCRIPTION OF THE PREFERRED EMBODIMENT

Figure 1:
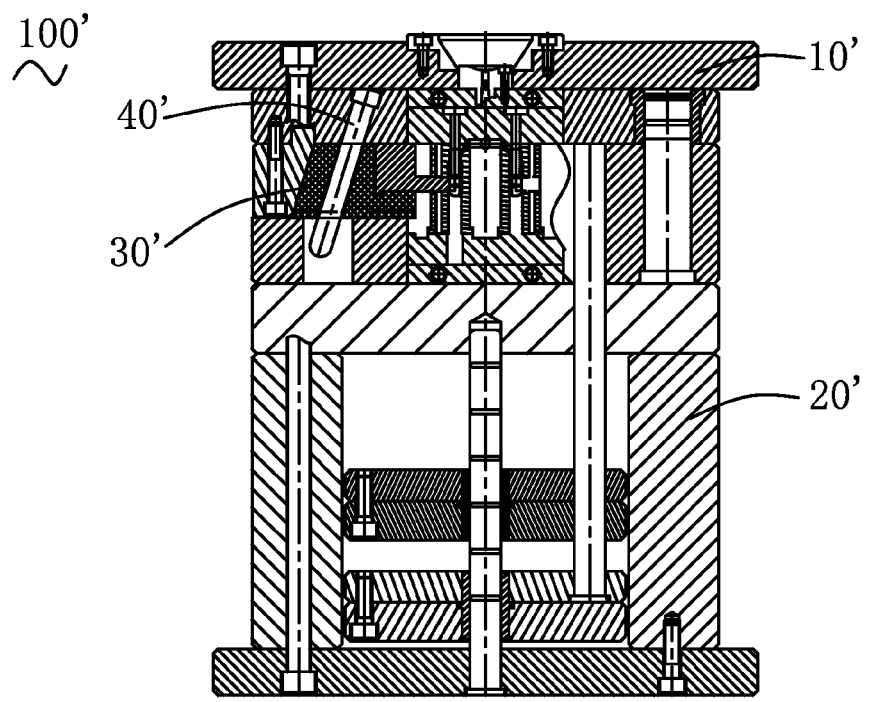
FIG. 1 is a cross-sectional view of a conventional mold, wherein the mold is opened.
Figure 2:
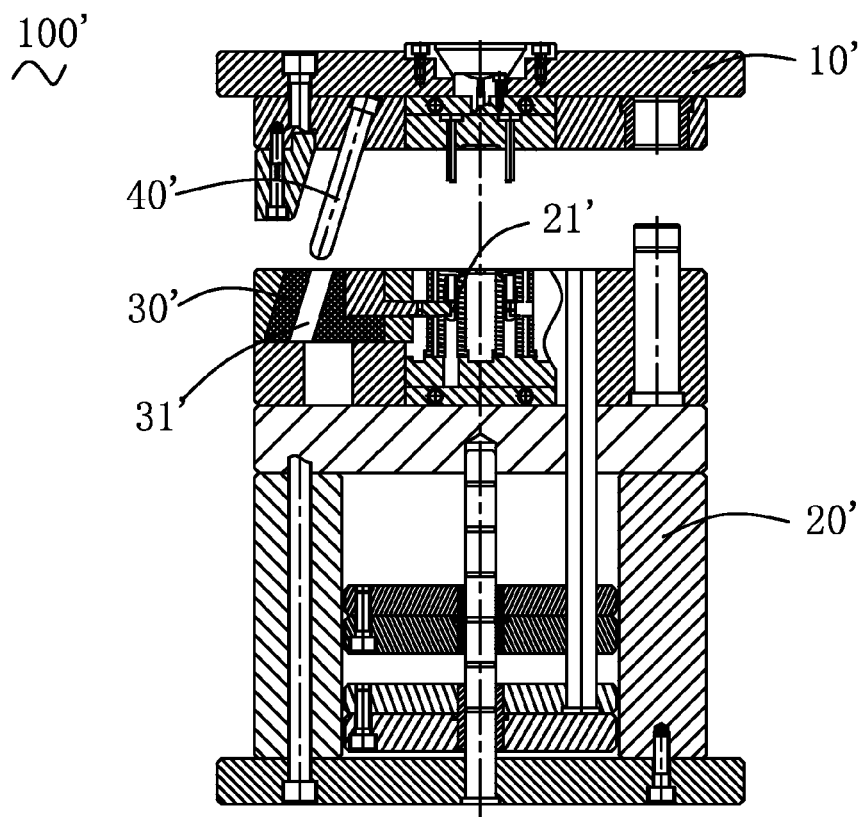
FIG. 2 is a cross-sectional view of the conventional mold, wherein the mold is closed.
Figure 3:
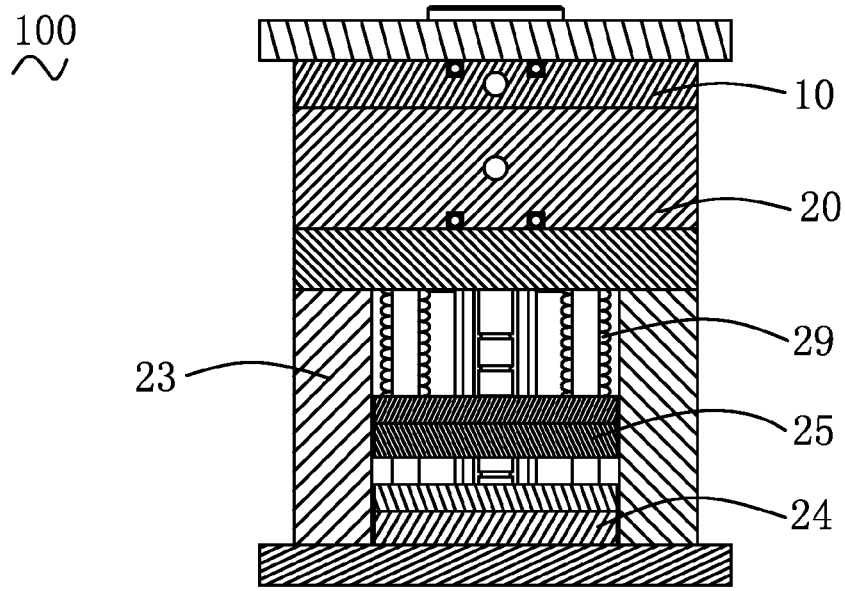
FIG. 3 is a front view of a mold constructed in accordance with the present invention.

Referring to FIGS. 3, 4, 5 and 6, a mold 100 with sliders in accordance with the present invention is adopted in a molding machine which has a push bar 50. The mold 100 comprises an upper mold member 10, a lower mold member 20, sliders 30, and ejector rods 40, which are movably mounted on the lower mold member 20 and are driven by the push bar 50.

The upper mold member 10 forms sustaining pieces 11 on two sides thereof. The upper mold member 10 carries upper-side slider pushing members 12 mounted thereon.

The lower mold member 20 comprises a top retaining plate 21, a bottom retaining plate 22, two side plates 23 vertically arranged on a top surface of the bottom retaining plate 22, and a pushing mechanism. A movement space is defined between the top retaining plate 21, the bottom retaining plate 22, and the side plates 23. The bottom retaining plate 22 has a vertical guiding post 221 secured thereon. The pushing mechanism comprises a first group of pushing plates 24, a second group of pushing plates 25, and pushing pins 26. The two groups of pushing plates 24 and 25 define guiding holes 243 and 253 therethrough, respectively. The guiding post 221 is received through the guiding holes 243 and 253, so that two groups of pushing plates 24 and 25 are movable along the guiding post 21 in a vertical direction. The first group of pushing plates 24 comprises an ejector-rod-holding plate 241. The second group of pushing plates 25 comprises a pushing-pin-holding plate 251. The pushing-pin-holding plate 251 is located above the ejector-rod-holding plate 241. The ejector-rod-holding plate 241 and the pushing-pin-holding plate 251 define evading holes 242 and 252, respectively. When the mold is closed, a journey clearance is defined between the pushing-pin-holding plate 251 and the ejector-rod-holding plate 241. A returning rod 27 is secured on the ejector-rod-holding plate 241 and extends to the top surface of the lower mold member 20. The pushing pins 26 are secured on the pushing-pin-holding plate 251. The top retaining plate 21 secures an end of a limiting bar 28. A returning spring 29 is arranged to encompass the limiting bar 28.

The sliders 30 are slidably mounted on the lower mold member 20. The sliders 30 each define a guiding groove 31, and have an outer angled surface 32 and an inner angled surface 33.

The ejector rods 40 are slidably mounted on the ejector-rod-holding plate 241 of the lower mold member 20. The ejector rods 40 each have a lower end movably extending into the movement space and are driven by the push bar 50. The ejector rods 40 have an end that is arranged to engage and thus be capable of pushing the inner angled surfaces 33 of the sliders 30 so that the sliders 30 are caused to slide on the lower mold member 20. The upper-side slider pushing members 12 are engageable with and thus capable of pushing the outer angled surfaces 32 of the sliders 30 so that the sliders 30 are caused to slide on the lower mold member 20.

Figure 4:
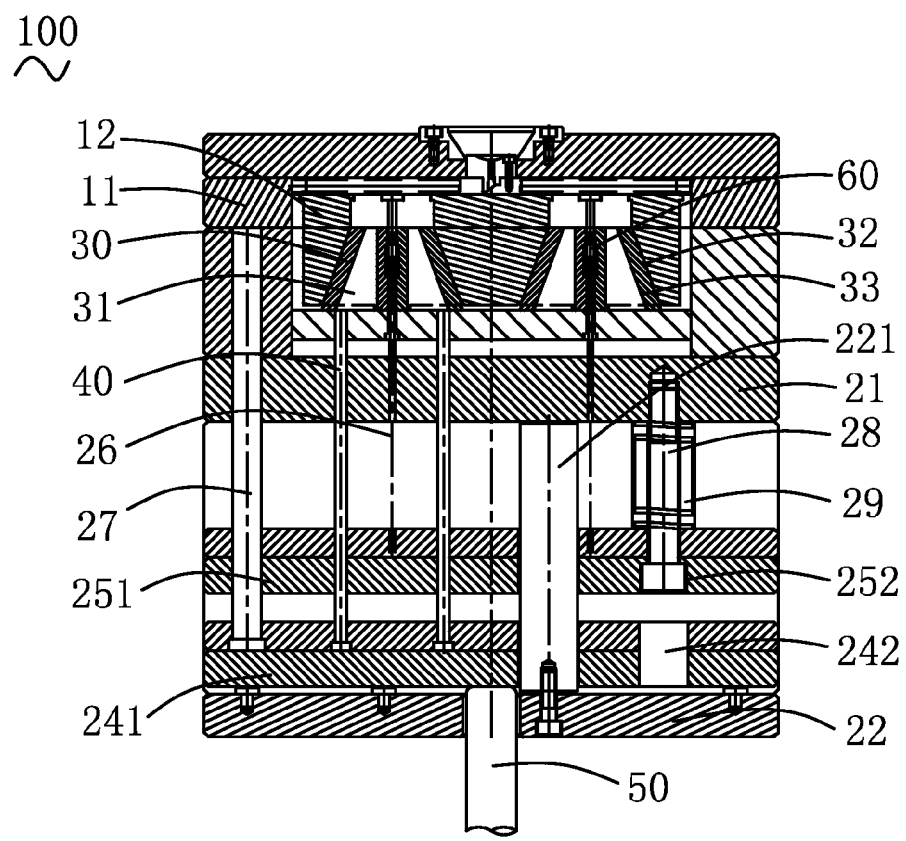
FIG. 4 is a cross-sectional view of the mold shown in FIG. 3, wherein the mold is closed.
Figure 5:
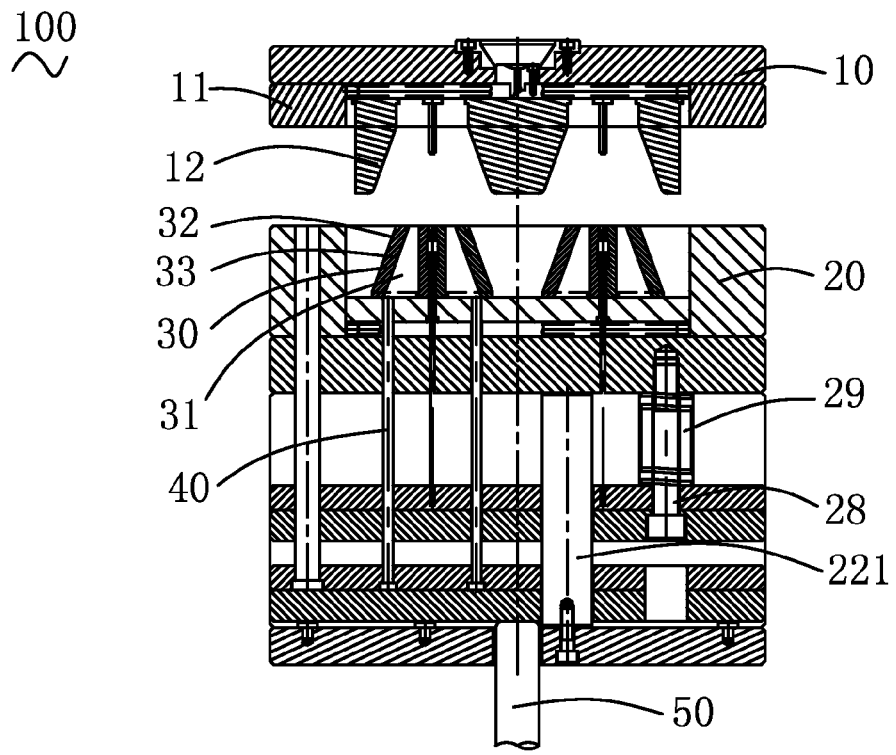
FIG. 5 is a cross-sectional view of the mold shown in FIG. 3, wherein the mold is in an opened state.
Figure 6:
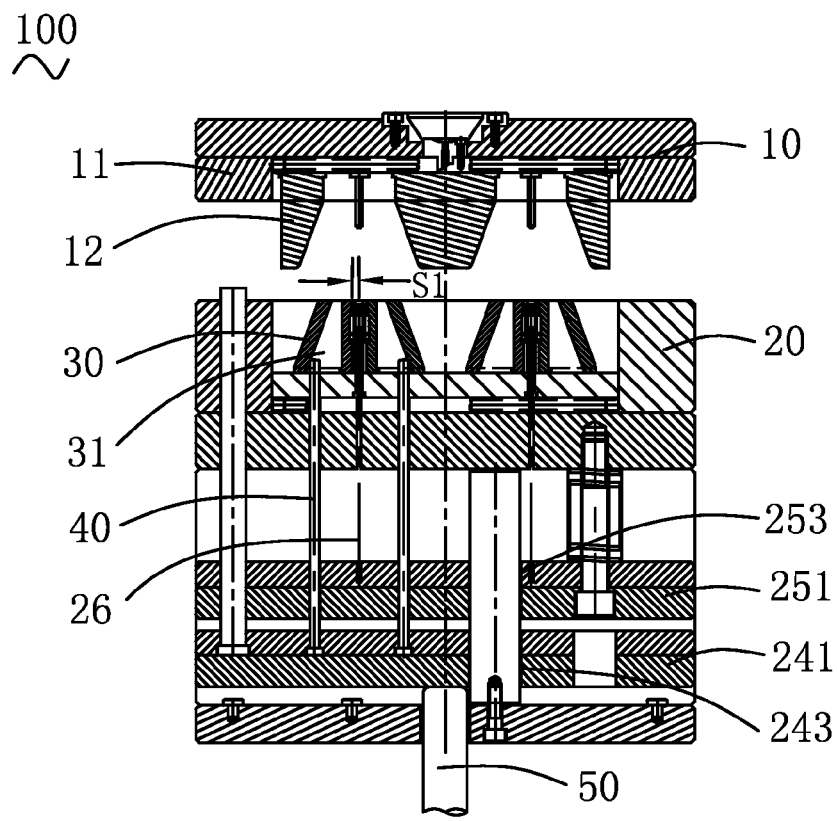
FIG. 6 is a cross-sectional view of the mold shown in FIG. 3, wherein the mold is in another opened state.
Figure 7:
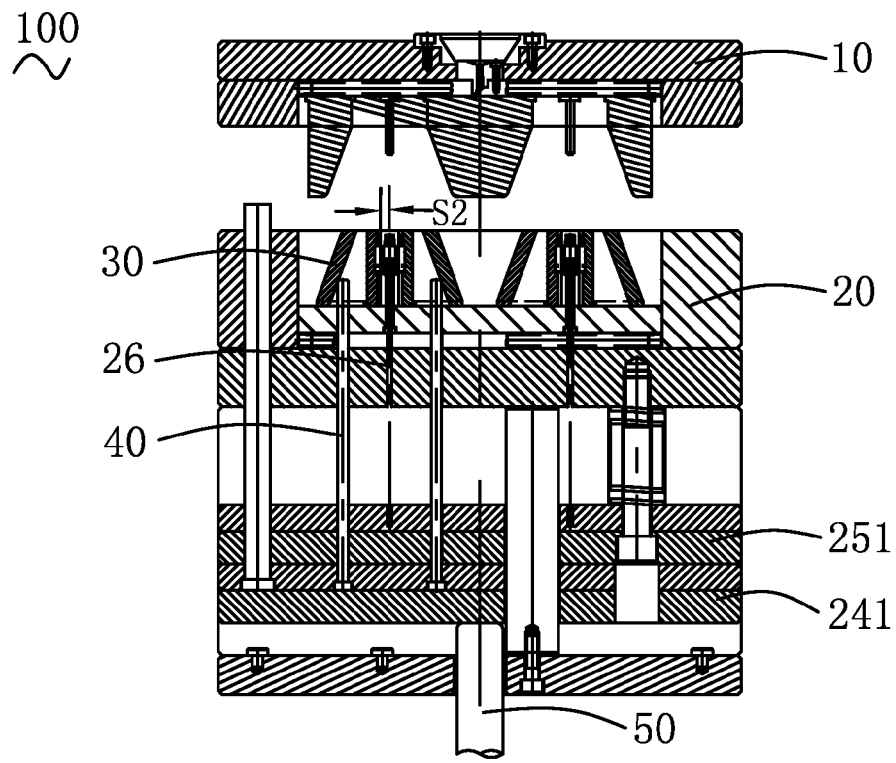
FIG. 7 is a cross-sectional view of the mold shown in FIG. 3, wherein the mold is in another opened state.
Figure 8:
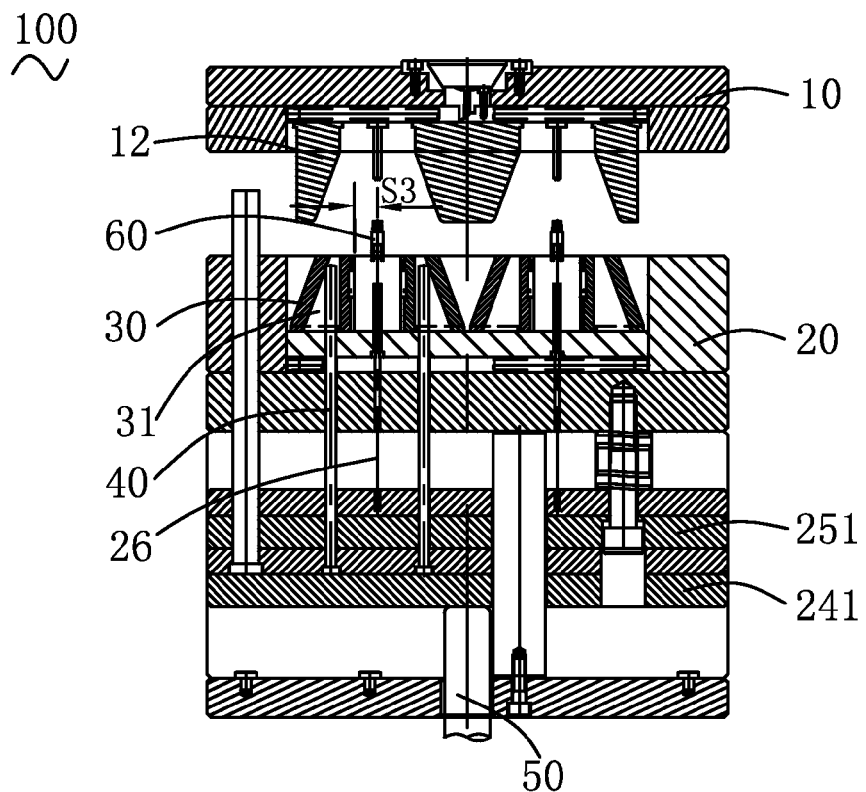
FIG. 8 is a cross-sectional view of the mold shown in FIG. 3, where finished products are being ejected from the mold.

Referring to FIGS. 4 and 8, when the mold 100 in accordance with the present invention is opened, the sliders 30 are kept stationary and thus maintain a closed state. After the mold 100 is opened completely and the molded products 60 are removed from the upper mold member 10, the push bar 50 extends through the bottom retaining plate 22 of the lower mold member 20 to push the ejector-rod-holding plate 241 to a 10 mm position. The ejector rods 40 engage and push the inner angled surfaces 33 of the sliders 30 by moving along the guiding groove 31, thereby pushing the sliders 30 to a S1 position (shown in FIG. 6). When the push bar 50 continues to push the ejector-rod-holding plate 241 to a 20 mm position, the ejector rods 40 push the sliders 30 to a S2 position (shown in FIG. 7). As a result, the two groups of pushing plates 24, 25 contact each other. When the push bar 50 continues to push the ejector-rod-holding plate 241, the limiting bar 28 extends through the evading holes 242 and 252 of the two groups of pushing plates 24, 25, thereby pushing the ejector-rod-holding plate 241 to a 50 mm position. As a result, the ejector rods 40 push the sliders 30 to a S3 position (shown in FIG. 8). Consequently, the pushing-pin-holding plate 251 can drive the pushing pins 26 to eject the molded products 60. When the mold 100 in accordance with the present invention is closed, the upper-side slider pushing members 12 of the upper mold member 10 downwardly depress the sliders 30 and cause the sliders 30 to return to the original positions. The sustaining pieces 11 of the upper mold member 10 push the returning rod 27 to drive the ejector-rod-holding plate 241 back to the original position. The returning spring 29 applies a spring force to the pushing-pin-holding plate 251 to return the two groups of pushing plates 24, 25 back to the original state before the mold 100 is opened under the control of the limiting bar 28. After being completely closed, the mold 100 is available for subsequent operation.

As stated previously, the mold 100 in accordance with the present invention adopts such an arrangement of the ejector rods 40 and the sliders 30 as to keep the sliders 30 in a closed state while the mold 100 is being opened, thereby preventing the molded products 60 from sticking to the upper mold member 10 and saving internal space for the sliders in the mold 100.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mold with sliders, which is adapted to be used with a molding machine which has a push bar, the mold comprising:
   an upper mold member;
   at least one upper-side slider pushing member, which secured on the upper mold member;
   a lower mold member, which defines a movement space;
   at least one slider, which is slidably mounted on the lower mold member, the slider forming an outer angled surface and an inner angled surface; and
   at least one ejector rod, which is movably mounted on the lower mold member, and has a lower end movably extending into the movement space and being drivable by the push bar;
   wherein the ejector rod has an end engageable and thus pushing the inner angled surface of the slider to move on the lower mold member, and wherein the upper-side slider pushing member is engageable and thus pushing the outer angled surface of the slider to move on the lower mold member.

2. The mold with sliders of claim 1, wherein the lower mold member comprises a top retaining plate, a bottom retaining plate, two side plates vertically positioned on a top surface of the bottom retaining plate, and a pushing mechanism, the top retaining plate, the bottom retaining plate and the side plates collectively delimiting the movement space, the bottom retaining plate having a vertical guiding post secured thereon.

3. The mold with sliders of claim 2, wherein the pushing mechanism comprises a first group of pushing plates, a second group of pushing plates, and pushing pins, the two groups of pushing plates respectively defining guiding holes extending therethrough, the guiding post being inserted into the guiding holes, whereby the two groups of pushing plates are movable along the guiding post in a substantial vertical direction.

4. The mold with sliders of claim 3, wherein the first group of pushing plates comprises an ejector-rod-holding plate, a lower end of the ejector rod being secured on the ejector-rod-holding plate, the push bar being operable to push the ejector-rod-holding plate.

5. The mold with sliders of claim 4, wherein the second group of pushing plates comprises a pushing-pin-holding plate, the at least one pushing pin being secured on the pushing-pin-holding plate, the pushing-pin-holding plate being located above the ejector-rod-holding plate, wherein when the mold is closed, a journey clearance is defined between the pushing-pin-holding plate and the ejector-rod-holding plate.

6. The mold with sliders of claim 5, wherein the top retaining plate comprises a limiting bar secured thereon for limiting the pushing-pin-holding plate while the mold is opened, the ejector-rod-holding plate and the pushing-pin-holding plate defining evading holes through which the limiting bar extends.

7. The mold with sliders of claim 4, wherein the ejector-rod-holding plate secures a returning rod thereon, the upper mold member forming sustaining pieces on two sides thereof, the sustaining pieces being operable to push the returning rod.

* * * * *